US008823641B2

(12) United States Patent
Kuhlman et al.

(10) Patent No.: US 8,823,641 B2
(45) Date of Patent: Sep. 2, 2014

(54) SYSTEM FOR PROJECTING 3D IMAGES AND DETECTING GESTURES

(75) Inventors: Frederick F. Kuhlman, Kokomo, IN (US); Daniel Leong Woon Loong, Punggol Field (SG); Yew Kwang Low, Singapore (SG); Kok Wee Yeo, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 170 days.

(21) Appl. No.: 13/477,737

(22) Filed: May 22, 2012

(65) Prior Publication Data

US 2013/0314311 A1 Nov. 28, 2013

(51) Int. Cl.
*G09G 5/00* (2006.01)

(52) U.S. Cl.
USPC ........... 345/156; 345/166; 345/175; 345/664; 463/5; 463/30; 463/34

(58) Field of Classification Search
USPC ......... 345/156, 173, 174, 175, 170, 179, 184, 345/172
See application file for complete search history.

(56) References Cited

U.S. PATENT DOCUMENTS

| 7,489,303 | B1* | 2/2009 | Pryor | 345/173 |
|---|---|---|---|---|
| 2005/0030622 | A1* | 2/2005 | Morita et al. | 359/464 |
| 2006/0266135 | A1 | 11/2006 | Nishikawa et al. | |
| 2008/0273178 | A1* | 11/2008 | Li et al. | 353/81 |
| 2009/0141334 | A1 | 6/2009 | Dean et al. | |
| 2009/0273575 | A1* | 11/2009 | Pryor | 345/173 |
| 2010/0225611 | A1 | 9/2010 | Lee et al. | |
| 2011/0058240 | A1 | 3/2011 | Dell'Eva et al. | |
| 2012/0076353 | A1 | 3/2012 | Large | |
| 2012/0223909 | A1* | 9/2012 | Tse et al. | 345/174 |

FOREIGN PATENT DOCUMENTS

| GB | 2 477 044 A | 7/2011 |
|---|---|---|
| WO | 2005/069044 A1 | 7/2005 |
| WO | 2006027748 | 3/2006 |

OTHER PUBLICATIONS

An Evaluation of Depth Perception on Volumetric Displays; Tovi Grossman, Ravin Balakrishnan; Department of Computer Science, University of Toronto; www.dgp.toronto.edu; pp. 193-200.
A Review of Phased Array Steering for Narrow-Band Electrooptical Systems; Paul F. McManamon, Philip J. Bos, Michael J. Escuti, Jason Heikenfeld, Steve Serati, Huikai Xie and Edward A. Watson; Proceedings of the IEE, vol. 97, No. 6, Jun. 2009; pp. 1078-1096.
Electrowetting Manipulation of Any Optical Film; L. Hou, N.R. Smith and J. Heikenfeld; Applied Physics Letters 90, 251114 (2007); 3 pages.
European Search Report dated Feb. 3, 2014.

* cited by examiner

*Primary Examiner* — Olga Merkoulova
(74) *Attorney, Agent, or Firm* — Lawrence D. Hazelton

(57) ABSTRACT

A three dimensional (3D) imaging system configured to display an autostereoscopic image of a scene toward a viewing area, and detect gestures occurring in the viewing area. The system includes an imaging device configured to project a plurality of projected images in distinct directions, and each projected image is characterized as a distinct perspective view of the scene. The imaging device is also configured to detect a plurality of received images for the purpose of detecting gestures. The system also includes a holographic diffuser, and a mirror arrangement configured to reflect the plurality of projected images from the imaging device toward the holographic diffuser to display an autostereoscopic image of the scene in the holographic diffuser, and reflect a plurality of perspective images from the viewing area toward the imaging device such that each received image corresponds to a distinct perspective view of the viewing area.

8 Claims, 2 Drawing Sheets

SYSTEM FOR PROJECTING 3D IMAGES AND DETECTING GESTURES

TECHNICAL FIELD OF INVENTION

This disclosure generally relates to a three dimensional (3D) imaging system configured to display an autostereoscopic image of a scene toward a viewing area, and detect gestures occurring in the viewing area.

BACKGROUND OF INVENTION

Three dimension (3D) displays using specialized glasses are known. A cost effective way to display 3D images without using specialized glasses in combination with gesture recognition is desired.

SUMMARY OF THE INVENTION

In accordance with one embodiment, a three dimensional (3D) imaging system configured to display an autostereoscopic image of a scene toward a viewing area, and detect gestures occurring in the viewing area is provided. The system includes an imaging device, a holographic diffuser, and a mirror arrangement. The imaging device is configured to project a plurality of projected images in distinct directions toward a projection field. Each projected image is characterized as a distinct perspective view of the scene. The imaging device is also configured to detect a plurality of received images from the distinct directions. The mirror arrangement is fixedly positioned in the projection field. The mirror arrangement is configured to reflect the plurality of projected images from the imaging device toward the holographic diffuser in a manner effective to display an autostereoscopic image of the scene in the holographic diffuser. The minor arrangement is also configured to reflect a plurality of perspective images from the viewing area toward the imaging device such that each received image corresponds to a distinct perspective view of the viewing area.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
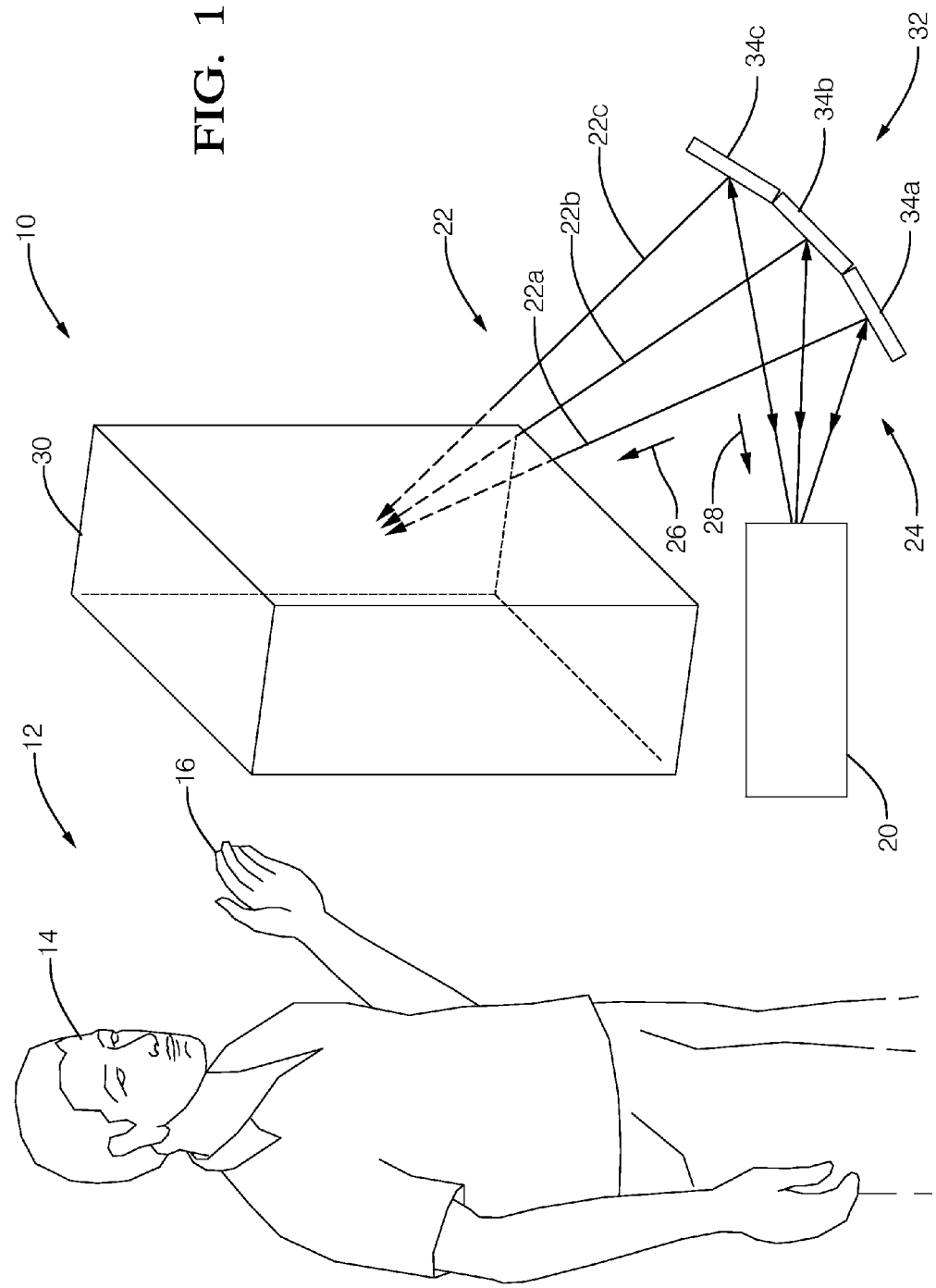
FIG. 1 is a three dimensional (3D) imaging system in accordance with one embodiment.

FIG. 1 illustrates a non-limiting example of a three dimensional (3D) imaging system, hereafter the system 10. In general, the system 10 is configured to display an autostereoscopic image of a scene toward a viewing area. As used herein, a scene includes, but is not limited to, any object or location that could be photographed from different perspectives by a camera, or a synthesized or animated 3D model of the object or location. The viewing area 12 is a location proximate to the system 10 from where a person 14 may view the autostereoscopic image produced by the system 10. Further details regarding displaying autostereoscopic images are provided in U.S. patent application Ser. No. 13/282,555 by Kuhlman et al., titled AUTOSTEREOSCOPIC 3D DISPLAY, and filed Oct. 27, 2011, the entire contents of which are hereby incorporated by reference herein.

The system 10 is also generally configured to detect gestures occurring in the viewing area 12, for example gestures made by the person 14 moving a hand 16. As will become apparent in the description that follows, the gestures may include motions of the hand 16 in three dimensions, and so physical contact with the system 10 is not required.

The system 10 may include an imaging device 20 configured to project a plurality of projected images indicated by lines showing distinct directions 22 that are individually indicated by lines 22a, 22b, 22c. The projected images travel toward a projection field 24 and travel in a projected direction 26. Each projected image may be characterized as a distinct perspective view of the scene that is to be displayed as part of an autostereoscopic image. In order to detect gestures, the imaging device 20 may also be configured to detect a plurality of received images from the viewing area traveling along distinct directions 22 and traveling in a received direction 28.

In order for the autostereoscopic image of the scene to be displayed toward the viewing area 12, the system 10 may include a holographic diffuser 30. The display of an autostereoscopic image by the system 10 has been demonstrated using sheets of clear acrylic material treated on one side to have a translucent appearance that are available from Art-Friend, 391 Orchard Road, #04-20M, Ngee Ann City, Singapore 238872; Part numbers: AF463095 ACRYLIC SHT MATT CLEAR 3 MM 9×12 IN or AF4630951 ACRYLIC SHT MATT CLEAR 3 MM 12×18 IN. Alternatively, the holographic diffuser 24 may be similar to that described in U.S. Pat. No. 4,799,739 to Newswanger, titled REAL TIME AUTOSTEREOSCOPIC DISPLAYS USING HOLOGRAPHIC DIFFUSERS, issued Jan. 24, 1989; or U.S. Pat. No. 5,609,939 to Peterson et al., titled VIEWING SCREEN FORMED USING COHERENT LIGHT, issued Mar. 11, 1997.

The system 10 may include a mirror arrangement 32 fixedly positioned in the projection field 24. By way of example and not limitation, the minor arrangement may include a plurality of flat mirrors 34a, 34b, 34c. The minor arrangement 32 is generally configured to reflect the plurality of projected images projecting from the imaging device 20 and indicated by lines 22a, 22b, 22c as traveling in the projected direction 26 toward the holographic diffuser 30 in a manner effective to display an autostereoscopic image of the scene in the holographic diffuser 30. The minor arrangement 32 is also generally configured to reflect a plurality of perspective images emanating from the viewing area 12 toward the imaging device 20 such that each received image corresponds to a distinct perspective view of the viewing area 12.

The non-limiting examples provided herein suggest three projected images, e.g. the lines 22a, 22b, 22c. However it is appreciated that only two projected images are required to provide a 3D image to a person 14. The third projected image, or any number of additional projected images, may be provided so the person 14 viewing the system 10 is not restricted to viewing from a single direction or a fixed viewing position, but may move to other viewing positions or viewing directions and still perceive a 3D image. With more than two projected images, the system 10 is able to show an autostereoscopic image that changes the apparent viewing perspective as the person 14 moves about the holographic diffuser 30.

Each projected image may be characterized as a distinct perspective view of the scene or object being displayed. For example, a projected image corresponding to line 22b may be characterized as a centered view of the scene being displayed; a projected image corresponding to line 22a may be characterized as a left-of-center view; and a projected image corresponding to line 22c may be characterized as a right-of-center view. Which view enters which eye of the person 14 depends on the location of the person 14.

It should be appreciated that if displaying a wider range of perspectives is desired, then additional projected images are needed. For example, if six different perspectives for the person 14 moving left and right were desired, then seven projected images may be required. The arrangement of the projected images is illustrated as a horizontal arrangement only for the purposes of explanation, and not limitation. For example, the system 10 may be configured to project another row of projected images (not shown) aligned below the projected images indicated by lines 22a, 22b, 22c so that the person 14 could also move up and down and perceive a change in perspective just as the change in perspective is perceived by moving left and right.

Figure 2:
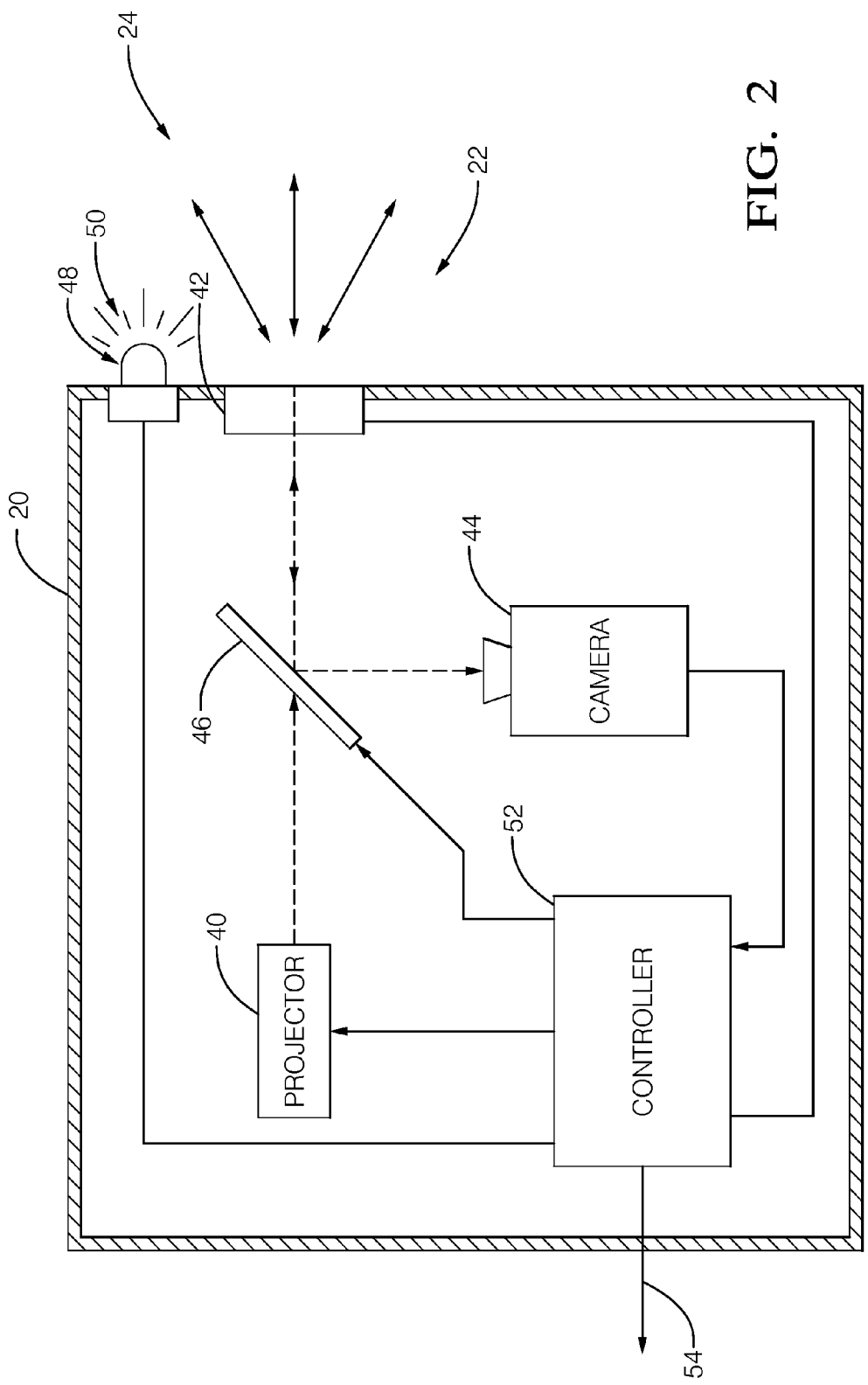
FIG. 2 is a diagram of an imaging device in the system of FIG. 1 in accordance with an embodiment.

FIG. 2 illustrates a non-limiting example of the imaging device 20 that includes a projector 40 configured to project the plurality of projected images toward an optical device 42 that cooperates with the projector 40 to project the projected images in distinct directions 22 toward a projection field 24. It is recognized that multiple cameras could be used to accomplish the same task, but doing so may undesirably increase the cost of the imaging device 20. The projector 40 may be any commercially available projector, such as a pico-projector, that is selected based on a desired projection resolution and other performance characteristics.

The optical device 42 may include a lens or combination of lenses that may variably control the focal distance and or viewing angle (e.g. narrow versus wide angle) of the optical device 42, the specifics of which is known to those skilled in the art of lenses. The optical device 42 may also include a Micro-Electro-Mechanical Systems (MEMS) actuated mirror that cooperates with the lens and the projector 40 to direct the projected images in distinct directions 22. The optical device 42 may use electrowetting technology to form an electrowetting prism and/or electrowetting lens to control the direction and focus of light passing through the optical device 42.

The imaging device 20 may also include a camera 44 configured to detect the plurality of received images from the distinct directions 22. The camera 44 may be a visible light camera or an infrared camera. An infrared camera may be preferable in some instances where illumination is required to detect a gesture. The camera 44 may be any commercially available camera selected based on the desired resolution and other desired performance characteristics.

The imaging device 20 may also include a beam splitter 46 arranged cooperatively with the projector 40 and the camera 44 so that the projected images and the received images can both pass through the optical device 42. The beam splitter 46 may be a half silvered minor or a switchable minor generally described as being operable to two states: transparent or reflective. Switchable mirrors include an LCD filled with crystals that are reflective in one state is available from Kentoptronics, or an electrowetting cell filled with liquid gallium, or an electrochromic minor.

The system 10 may include an infrared (IR) light emitter 48 configured to illuminate the viewing area with IR light 50. In the non-limiting example shown in FIG. 2, the IR light emitter 48 is part of the imaging device 20. However it is recognized that the IR light emitter could be placed more proximate to the person 14 to effectively illuminate the hand 16.

The system 10 may also include a controller 52 coupled to the various devices in the imaging device 20 in order to control those various devices. For example, the controller may coordinate the operation of the projector 40, the optical device 42, the camera 44, the beam splitter 46, and the IR emitter 48. By way of further example and not limitation, the controller 52 may be configured to determine a gesture based on the received images detected by the camera 44. Imaging processing algorithms for detecting gestures are generally known.

The controller 52 may also be configured to control the perspective of the scene shown to the person by the holographic diffuser 30 displayed based on the gesture. For example, if the person 14 moves the hand 16 laterally, the controller may change the perspectives of the projected images so the scene displayed to the person 14 appears to rotate. Alternatively, the controller may be configured to output a control signal 54 to some other device or system in response to a gesture. For example, if the person 14 moves the hand 16 vertically, the controller 52 may output a control signal 54 to an audio entertainment system (not shown) effective to change the volume of music being output by the audio entertainment system.

It should be understood that the projected images indicated by lines 22a, 22b, 22c that are output by the imaging device 20 are generally narrow beams so that each projected image is seen by only one eye of the person 14. However, for gesture recognition the size of the individual areas indicated by lines 22a, 22b, 22c that are seen by the camera 44 may be larger, and so the optical device 42 may preferably have a variable view angle. Furthermore, as the expected location of the person's eyes may not correspond to the expected location of the hand 16, the area covered by the projected images may not correspond to the area covered by the received images, and this change in covered areas may be facilitated by the optical device 42 and or mirror arrangement 32.

Accordingly, three dimensional (3D) imaging system (the system 10) configured to display an autostereoscopic image of a scene toward a viewing area, and detect gestures occurring in the viewing area is provided. The system makes dual use of some devices such as the mirror arrangement 32 and the optical device 42 so that both display of 3D images and detection of 3D gestures are available from an economical system.

While this invention has been described in terms of the preferred embodiments thereof, it is not intended to be so limited, but rather only to the extent set forth in the claims that follow.

We claim:

1. A three dimensional (3D) imaging system configured to display an autostereoscopic image of a scene toward a viewing area, and detect gestures occurring in the viewing area, said system comprising:

an imaging device configured to project through a lens a plurality of projected images in distinct directions toward a projection field, wherein each projected image is characterized as a distinct perspective view of the scene, said imaging device also configured to detect through the same lens a plurality of received images from the distinct directions;

a holographic diffuser; and a mirror arrangement fixedly positioned in the projection field, said minor arrangement configured to reflect the plurality of projected images from the imaging device toward the holographic diffuser in a manner effective to display an autostereoscopic image of the scene in the holographic diffuser, and reflect a plurality of perspective images from the viewing area toward the imaging device such that each received image corresponds to a distinct perspective view of the viewing area.

2. The system in accordance with claim 1, wherein the imaging device includes a projector to project through the lens the plurality of projected images in distinct directions toward a projection field, and a camera to detect through the lens the plurality of received images from the distinct directions.

3. The system in accordance with claim 2, wherein the imaging device includes an electrowetting prism configured to direct projected images from the projector in the distinct directions.

4. The system in accordance with claim 2, wherein the imaging device includes an electrowetting prism configured to direct received images from the distinct directions to the camera.

5. The system in accordance with claim 1, wherein the imaging device includes an infrared (IR) camera to detect the plurality of received images.

6. The system in accordance with claim 1, wherein the system includes an infrared (IR) light emitter configured to illuminate the viewing area with IR light.

7. The system in accordance with claim 1, wherein the system includes a controller configured to determine a gesture based on the received images.

8. The system in accordance with claim 7, wherein the controller is further configured to control the perspective of the scene displayed based on the gesture.

* * * * *